(12) United States Patent
Takashige et al.

(10) Patent No.: US 6,221,502 B1
(45) Date of Patent: Apr. 24, 2001

(54) EASY-CLEAVAGE SHRINK LAMINATE FILM AND THE BAG USING THE SAME

(75) Inventors: Masao Takashige; Takeo Hayashi, both of Himeji (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/146,335

(22) Filed: Sep. 2, 1998

(30) Foreign Application Priority Data

Sep. 19, 1997 (JP) .................................................. 9-254992

(51) Int. Cl.[7] .................................................. B32B 27/08
(52) U.S. Cl. .................................. 428/475.5; 428/475.8; 428/476.1; 428/34.3; 428/34.9
(58) Field of Search ............................. 428/475.5, 475.8, 428/476.1, 34.3, 34.9

(56) References Cited

U.S. PATENT DOCUMENTS

| | | | |
|---|---|---|---|
| 5,541,011 | 7/1996 | Takashige et al. | 428/213 |
| 5,858,550 | * 1/1999 | Tsai | 428/474.4 |
| 5,874,155 | * 2/1999 | Gehrke | 428/134 |
| 5,925,305 | 7/1999 | Takashige et al. | 264/519 |
| 5,935,637 | * 8/1999 | Gesse | 428/220 |

FOREIGN PATENT DOCUMENTS 0 903 220 A2   3/1999 (EP) .

* cited by examiner

Primary Examiner—Leszek Kiliman
(74) Attorney, Agent, or Firm—Oblon, Spivak, McClelland, Maier & Neustadt, P.C.

(57) ABSTRACT

Disclosed are an easy-cleavage shrink laminate film which is harmless to the environment, easy to tear and moderately shrinkable, and a bag made of the laminate film. The easy-cleavage shrink laminate film 22 has a basic, two-layered structure composed of an easy-cleavage shrink film 19 and a sealant film 21, and may optionally comprise an additional sealant film 21 and/or a substrate film 25 to have a multi-layered structure. The easy-cleavage shrink film 19 comprises from 40 to 85 parts by weight of Ny 6 and from 15 to 60 parts by weight of MXD 6, and this is drawn at an orientation ratio of not smaller than 2.8 times both in the MD direction and in the TD direction and thermally fixed at a heat-treating temperature falling between 120 and 195° C. to thereby have a degree of shrinkage of from 15 to 40% when it is put in hot water at 120° C. under pressure of about 2.0 kg/cm$^2$ for 20 minutes.

3 Claims, 3 Drawing Sheets

EASY-CLEAVAGE SHRINK LAMINATE FILM AND THE BAG USING THE SAME

FIELD OF THE INVENTION

The present invention relates to an easy-cleavage shrink laminate film and a bag using the same, which are easy to tear and are used for, for example, packaging foods, medicines, industrial materials, etc.

BACKGROUND OF THE INVENTION

Heretofore, in general, polyvinylidene chloride (PVDC) has been used as the material for wrapping and packaging hams, sausages, etc.

However, polyvinylidene chloride is problematic in that it produces chlorine gas when incinerated. With the recent increase in the awareness of environmental problems, it is much desired that conventional wrapping and packaging materials of chlorine resins are substituted with any others that are gentle to the environment.

Forming conventional wrapping and packaging materials into bags requires high-frequency sealing machines for high-temperature heat sealing.

To open them, bags of conventional wrapping and packaging materials are not easy to tear by hand.

A system of casing sausages is known, in which the cases formed are fixed with metal bands of aluminium or the like around their upper and lower sides. However, as having the metal bands, the cases are problematic in that they could not be applied to metal detectors for detecting impurities.

SUMMARY OF THE INVENTION

Given that situation, the present invention is to provide an easy-cleavage shrink laminate film which is harmless to the environment, which is easy to tear and which is moderately shrinkable, and to provide a bag using it.

Specifically, the invention provides an easy-cleavage shrink laminate film comprising an easy-cleavage shrink film and a sealant film as laminated on one or both surfaces of the easy-cleavage shrink film, in which the easy-cleavage shrink film comprises from 40 to 85 parts by weight of nylon 6 (Ny 6) and from 15 to 60 parts by weight of meta-xylylene adipamide (MXD 6) (provided that Ny 6+MXD 6=100 parts by weight), and has been drawn at an orientation ratio of not smaller than 2.8 times both in the MD direction (machine direction in which the film is moved during drawing) and in the TD direction (transverse direction, or that is, the widthwise direction of the film) and thermally fixed at a heat-treating temperature falling between 120 and 195° C. to thereby have a degree of shrinkage of from 15 to 40% when the film is put in hot water at 120° C. under pressure of about 2.0 kg/cm$^2$ for 20 minutes.

The invention also provides a bag using the easy-cleavage shrink laminate film.

DETAILED DESCRIPTION OF THE INVENTION

Figure 1:
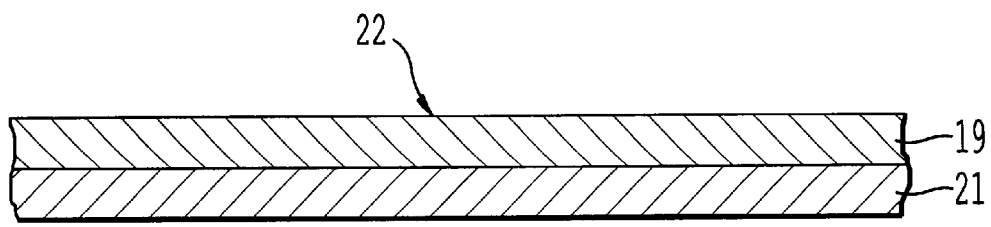
FIG. 1 is a cross-sectional view showing the constitution of the first embodiment of the easy-cleavage shrink laminate film of the invention.

The first aspect of the invention is an easy-cleavage shrink laminate film comprising an easy-cleavage shrink film and a sealant film as laminated on one surfaces of the easy-cleavage shrink film, in which the easy-cleavage shrink film comprises from 40 to 85 parts by weight of nylon 6 (Ny 6) and from 15 to 60 parts by weight of meta-xylylene adipamide (MXD 6) (provided that Ny 6+MXD 6=100 parts by weight), and has been drawn at an orientation ratio of not smaller than 2.8 times both in the MD direction and in the TD direction and thermally fixed at a heat-treating temperature falling between 120 and 195° C. to thereby have a degree of shrinkage of from 15 to 40% when the film is put in hot water at 120° C. under pressure about 2.0 kg/cm$^2$ for 20 minutes.

Regarding the ratio between Ny 6 and MXD 6 that constitute the easy-cleavage shrink film, the amount of Ny 6 is from 40 to 85 parts by weight and that of MXD 6 is from 15 to 60 parts by weight, but preferably the former is from 50 to 80 parts by weight and the latter is from 20 to 50 parts by weight.

If the MXD 6 content is smaller than 15 parts by weight, the film will have poor easy-cleavage and linear cut performance. On the other hand, if the MXD 6 content is larger than 60 parts by weight, the impact strength of the film greatly decreases and the film will be of little use in practice.

The easy-cleavage shrink film is prepared by melting and kneading a raw material comprising from 40 to85 parts by weight of Ny 6 and from 15 to 60 parts by weight of MXD 6, extruding the resulting melt into a film, cooling it, and drawing the original film at an orientation ratio of not smaller than 2.8 times in both the MD direction and the TD direction.

If the orientation ratio is smaller than 2.8 times, the film will have poor easy-cleavage and linear cut performance. If so, in addition, the impact strength of the film decreases and the film will be of little use in practice. Preferably, the orientation ratio is not smaller than 3.0 times.

For drawing the original film, preferably employed is a tubular method of biaxial drawing.

The thus-oriented film is then thermally fixed at a heat-treating temperature falling between 120 and 195° C.

In this step, if the heat-treating temperature is lower than 120° C., the film will have a too large degree of shrinkage. The film having such a large degree of shrinkage is often wrinkled when it absorbs moisture during storage and transportation and is unfavorably unstable.

If, however, the heat-treating temperature is higher than 195° C., the film will be too much crystallized, and its degree of shrinkage at the intended temperature will be small. In addition, the film could not shrink satisfactorily when used in wrapping or packaging, and the wrapped or packaged products will have poor outward appearance.

The easy-cleavage shrink film shall have a degree of shrinkage of from 15 to 40% when it is put in hot water at 120° C. under pressure of about 2.0 kg/cm² for 20 minutes. If the degree of shrinkage of the film under the defined condition is smaller than 15%, the film could not well shrink when used in wrapping or packaging, and its ability to airtightly wrap and package products will be poor. However, if its degree of shrinkage in question is larger than 40%, the film will too much shrink when used in wrapping or packaging, resulting in that the wrapped or packaged products will be deformed. The pressure heating condition for defining the degree of shrinkage of the film is that the film is heated in hot water at 120° C. under pressure of about 2.0 kg/cm² for 20 minutes, and this corresponds to the thermal sterilization (retorting) condition for sausages or the like as wrapped or packaged with the film.

The easy-cleavage shrink film is laminated with a sealant film. The material of the sealant film includes L-LDPE (linear low-density polyethylene), LDPE (low-density polyethylene), HDPE (high-density polyethylene), CPP (casting polypropylene), EVA (ethylene-vinyl acetate copolymer), PB (polybutene-1), ionomer, PMMA (polymethyl methacrylate), EMAA (ethylene-methacrylic acid copolymer), EAA (ethylene-acrylic acid copolymer), EMMA (ethylene-methyl methacrylate copolymer), and their mixtures.

The easy-cleavage shrink film has good gas-barrier performance, and the laminate film comprising the easy-cleavage shrink film also has good gas-barrier performance.

The laminate film of the invention has at least two layers of the easy-cleavage shrink film and the sealant film, and the open surface of the easy-cleavage shrink film may be laminated with any of various substrate films.

The material of the substrate films includes, for example, those noted above for the sealant film, and PET (polyethylene terephthalate), EVOH (ethylene-vinyl alcohol copolymer hydrolysate), PVA (polyvinyl alcohol), PP (polypropylene), Ny (nylon), HDPE (high-density polyethylene), PS (polystyrene), etc. Biaxial or monoaxial oriented films or non-oriented films of any of those materials are employable as the substrate films.

The laminate film of the invention may contain any desired additives.

The additives include, for example, anti-blocking agents (inorganic fillers, etc.), water-repellents (ethylene-bisstearates, etc.), lubricants (calcium stearate, etc.).

Laminating the films into the easy-cleavage shrink laminate film of the invention may be attained, for example, through extrusion lamination, hot-melt lamination, dry lamination, wet lamination or the like.

The second aspect of the invention is a modification of the easy-cleavage shrink laminate film of the first aspect noted above, in which the open surface of the easy-cleavage shrink film is also laminated with a sealant film, or that is, the both surfaces of the easy-cleavage shrink film are laminated with a sealant film.

For the sealant film in this second aspect, referred to are the same as those in the first aspect noted above.

Accordingly, a three-layered laminate film of sealant film/easy-cleavage shrink film/sealant film is within the scope of the invention.

Also within the scope of the invention is a four-layered laminate film, in which a suitable substrate film of a third layer is interposed between the easy-cleavage shrink film and the second sealant film. For the base film in this aspect, referred to are the same as those in the first aspect noted above.

The third aspect of the invention is a bag using the easy-cleavage shrink laminate film of any of the first or second aspect of the invention.

The bag is used for wrapping or packaging foods such as hams, sausages, cooked foods and the like that require airtight sealing in the bag having shrunk.

Preferred embodiments of the invention are described in detail hereinunder.

First Embodiment

FIG. 1 is referred to, which illustrates the first embodiment of the invention. As in FIG. 1, the easy-cleavage shrink laminate film 22 of the first embodiment has a two-layered structure composed of an easy-cleavage shrink film 19 and a sealant film 21 as laminated on one surface of the easy-cleavage shrink film 19.

The easy-cleavage shrink film 19 comprises from 40 to 85 parts by weight of Ny 6 and from 15 to 60 parts by weight of MXD 6 (provided that Ny 6+MXD 6=100 parts by weight), and this is drawn at an orientation ratio of not smaller than 2.8 times both in the MD direction and in the TD direction and thermally fixed at a heat-treating temperature falling between 120 and 195° C. to thereby have a degree of shrinkage of from 15 to 40% when it is put in hot water at 120° C. under pressure of about 2.0 kg/cm² for 20 minutes.

The sealant film 21 is of CPP, L-LDPE, LDPE, HDPE, EVA or the like.

The bag of this embodiment is made of the easy-cleavage shrink laminate film 22.

Second Embodiment

Figure 2:
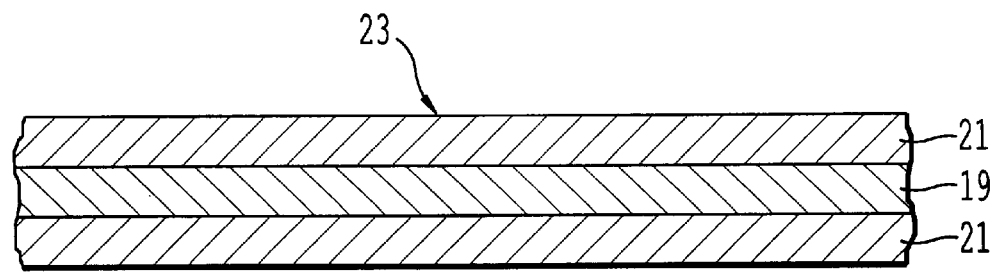
FIG. 2 is a cross-sectional view showing the constitution of the second embodiment of the easy-cleavage shrink laminate film of the invention.

FIG. 2 is referred to, which illustrates the second embodiment of the invention. As in FIG. 2, the easy-cleavage shrink laminate film 23 of the second embodiment has a three-layered structure composed of an easy-cleavage shrink film 19, a sealant film 21 as laminated on one surface of the easy-cleavage shrink film 19, and a sealant film 21 as laminated on the other surface of the easy-cleavage shrink film 19.

The easy-cleavage shrink film 19 and the sealant film 21 are the same as those in the first embodiment noted above.

The bag of this embodiment is made of the easy-cleavage shrink laminate film 23.

In this embodiment, the sealant film 21 is disposed at the both surfaces of the laminate film 23. Accordingly, the laminate film 23 is applicable to "back-to-back sealing" of sealing the sealant film 21 of the same layer at its both ends, or to "envelope sealing" of sealing the sealant film 21 of one surface layer with that of the other surface layer.

Third Embodiment

Figure 3:
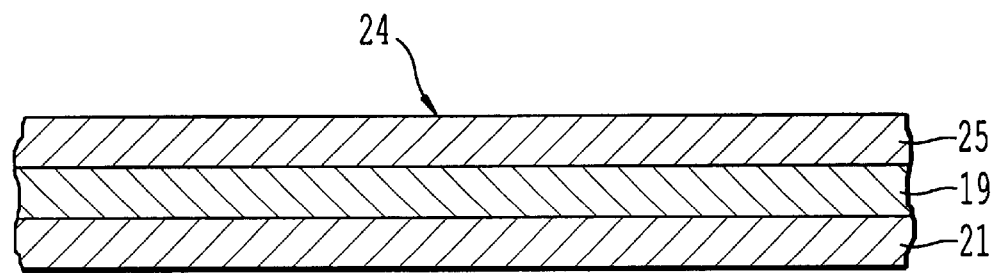
FIG. 3 is a cross-sectional view showing the constitution of the third embodiment of the easy-cleavage shrink laminate film of the invention.

FIG. 3 is referred to, which illustrates the third embodiment of the invention. As in FIG. 3, the easy-cleavage shrink laminate film 24 of the third embodiment has a three-layered structure composed of an easy-cleavage shrink film 19, a sealant film 21 as laminated on one surface of the easy-cleavage shrink film 19, and a substrate film 25 as laminated on the other surface of the easy-cleavage shrink film 19.

The easy-cleavage shrink film 19 and the sealant film 21 are the same as those in the first embodiment noted above.

The base film 25 is of PET, EVOH, PP, Ny or the like.

The bag of this embodiment is made of the easy-cleavage shrink laminate film 24.

Fourth Embodiment

Figure 4:
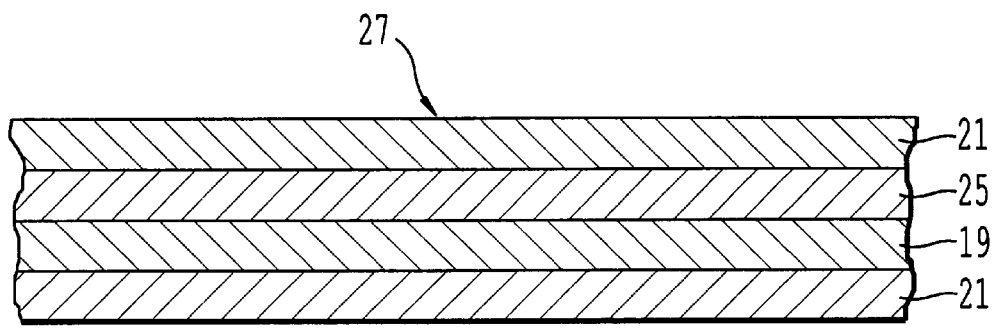
FIG. 4 is a cross-sectional view showing the constitution of the fourth embodiment of the easy-cleavage shrink laminate film of the invention.

FIG. 4 is referred to, which illustrates the fourth embodiment of the invention. As in FIG. 4, the easy-cleavage shrink laminate film 27 of the fourth embodiment has a four-layered structure composed of an easy-cleavage shrink film 19, a sealant film 21 as laminated on one surface of the easy-cleavage shrink film 19, a substrate film 25 as laminated on the other surface of the easy-cleavage shrink film 19, and a sealant film 21 as laminated on the substrate film 25.

The easy-cleavage shrink film 19, the sealant film 21 and the base film 25 are the same as those in the first and third embodiments noted above.

The bag of this embodiment is made of the easy-cleavage shrink laminate film 27.

The invention is described in further detail hereinunder with reference to the following Examples, which, however, are not intended to restrict the scope of the invention.

EXAMPLE 1

The easy-cleavage shrink laminate film 22 of this Example has a two-layered structure as in the first embodiment.

First, a mixture comprised of 60 parts by weight of Ny 6 and 40 parts by weight of MXD 6 was melted and kneaded at 260° C. in a extruder, and the resulting melt was extruded out through the die having a diameter of 90 mm into a cylindrical film, which was then rapidly cooled in water to form an original film.

Ny 6 used herein is nylon 6 produced by UBE INDUSTRIES LIMITED (trade name: UBE NYLON 1022 FD, having a relative viscosity $\eta r=3.6$); and MXD 6 is meta-xylylene adipamide produced by MITSUBISHI GAS CHEMICAL COMPANY INC. (trade name: MX NYLON 6007, having a relative viscosity $\eta r=2.7$).

Figure 5:
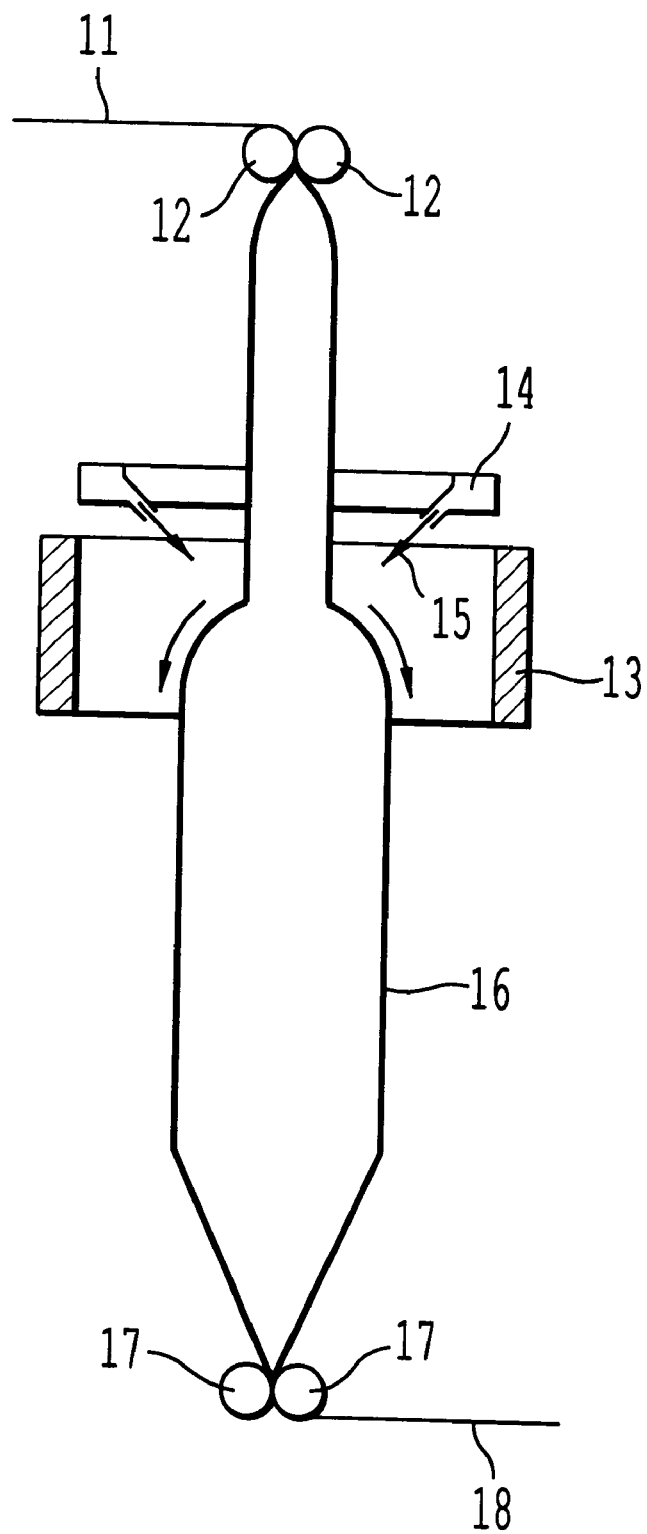
FIG. 5 is a graphic view showing the outline of an apparatus for biaxial orientation used in the method for producing the easy-cleavage film in Examples of the invention.

Next, as in FIG. 5, the original film 11 was biaxially drawn in both the MD direction and the TD direction in a tubular method, in which the film 11 was passed through a pair of nip-rollers 12, expanded into a bubble 16 while being heated with a heater 13 with introducing pressure vapor thereinto and with applying air streams 15 thereto through an airing 14 at the starting point of orientation, and taken out via a pair of nip-rollers 17 disposed at the downstream side of the apparatus to obtain an easy-cleavage film 18. The orientation ratio in this method was 3.0 times in both the MD direction and the TD direction.

Next, the easy-cleavage film 18 was introduced into a heat-treating furnace of a tenter type, and was thermally fixed therein at 160° C. for 10 seconds. Thus was obtained an easy-cleavage shrink film 19. This film 19 was easy to tear and to cut linearly. The degree of shrinkage of the easy-cleavage shrink film 19 in hot water at 120° C. under pressure of about 2.0 kg/cm$^2$ for 20 minutes was 29% in the MD direction and 27% in the TD direction.

Next, as in FIG. 1, the easy-cleavage shrink film (thickness: 15 μm) 19 was dry-laminated with a sealant film 21 to prepare an easy-cleavage shrink laminate film 22 of this Example. The sealant film 21 is a common polypropylene film (trade name: UNILAX, produced by IDEMITSU PETROCHEMICAL CO., LTD., having a thickness of 30 μm). The gas barrier performance of the laminate film obtained herein was 10 cc/m$^2$·24 hrs. at 23° C. and at a relative humidity (RH) of 60%.

Next, using a bag-forming machine, the easy-cleavage shrink laminate film 22 was formed into bags of this Example.

Figure 6:
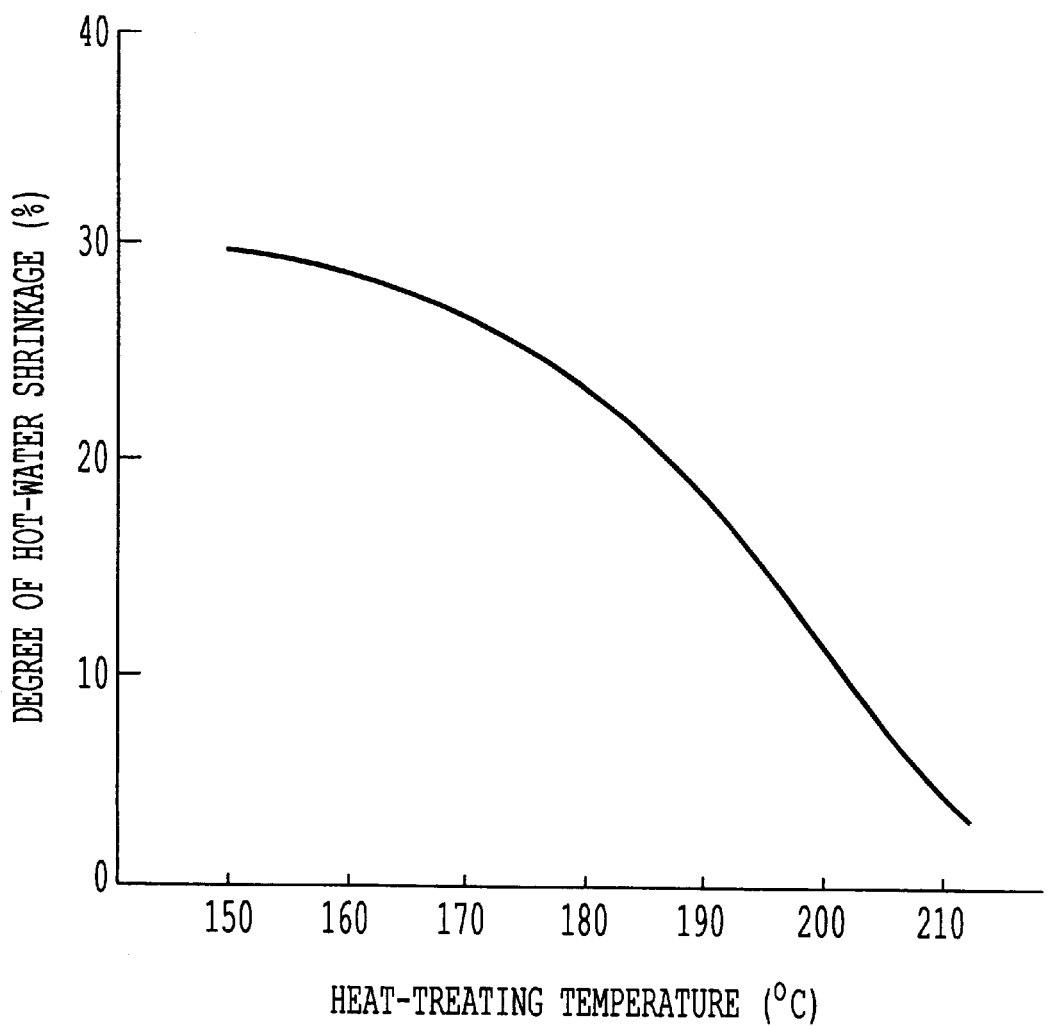
FIG. 6 is a graph showing the relationship between the heat-treating temperature for thermal fixation of an easy-cleavage film and the degree of shrinkage of the heat-treated film in hot water at 120° C. under pressure of about 2.0 kg/cm$^2$ for 20 minutes.

In this Example, the heat-treating temperature for the thermal fixation to prepare the easy-cleavage shrink film 19 was 160° C. Apart from this, the film 18 was heat-treated at different temperatures, and the degree of shrinkage of the heat-treated film in hot water at 120° C. under pressure of about 2.0 kg/cm$^2$ for 20 minutes was measured and plotted in FIG. 6.

EXAMPLE 2

The easy-cleavage shrink laminate film 23 of this Example has a three-layered structure as in the second embodiment.

As in FIG. 2, the first layer and the second layer of this easy-cleavage shrink laminate film 23 are the same as those constituting the two-layered structure of Example 1. In the film 23, in addition, a third layer of the sealant film 21 is laminated on the other surface of the easy-cleavage shrink film 19. The gas barrier performance of the laminate film 23 was 10 cc/m$^2$·24 hrs.

EXAMPLES 3 to 6

Herein produced were easy-cleavage shrink laminate films 23 all having a three-layered structure as in the second embodiment. In these Examples, however, the amounts of Ny 6 and MXD 6 used and the heat-treating temperature were varied as in Table 1 below.

The degree of shrinkage of the easy-cleavage shrink film 19 in each Example, in hot water at 120° C. under pressure of about 2.0 kg/cm$^2$ for 20 minutes is in Table 1.

The gas barrier performance of the laminate films of Examples 3 to 5 was 13 cc/m$^2$·24 hrs., and that of the laminate film of Example 6 was 16 cc/m$^2$·24 hrs.

EXAMPLE 7

The easy-cleavage shrink laminate film 24 of this Example has a three-layered structure as in the third embodiment.

As in FIG. 3, the first layer and the second layer of this easy-cleavage shrink laminate film 24 are the same as those constituting the two-layered structure of Example 1. In the film 24, in addition, a third layer of abase film 25 is laminated on the other surface of the easy-cleavage shrink film 19.

In this Example, the base film 25 is an oriented nylon 6 film (trade name: UNILON, produced by IDEMITSU PET- ROCHEMICAL CO., LTD., having a thickness of 15 µm). The gas barrier performance of the laminate film 24 was 12 cc/m²·24 hrs.

EXAMPLE 8

The easy-cleavage shrink laminate film 27 of this Example has a four-layered structure as in the fourth embodiment.

As in FIG. 4, the first layer and the second layer of this easy-cleavage shrink laminate film 27 are the same as those constituting the two-layered structure of Example 1. In the film 27, in addition, a fourth layer of a sealant film 21 is laminated on the other surface of the easy-cleavage shrink film 19 via a substrate film 25 therebetween.

The base film 25 and the sealant film 21 are the same as those in the previous Examples.

The gas barrier performance of the laminate film 27 was 12 cc/m²·24 hrs.

COMPARATIVE EXAMPLES 1 to 6

In Comparative Example 1, produced was a two-layered laminate film like in the first embodiment; and in Comparative Examples 2 to 6, produced were three-layered laminate films like in the second embodiment. In those Comparative Examples, however, the amounts of Ny 6 and MXD 6 used and the heat-treating temperature were varied as in Table 2.

The degree of shrinkage of the easy-cleavage film in each Comparative Example, in hot water at 120° C. under pressure of about 2.0 kg/cm² for 20 minutes is in Table 2.

The gas barrier performance of the laminate films of Comparative Examples 1 and 2 was 16 cc/m²·24 hrs.; that of the laminate film of Comparative Example 3 was 13 cc/m²·24 hrs.; that of the laminate film of Comparative Example 4 was 20 cc/m²·24 hrs.; and that of the laminate films of Comparative Examples 5 and 6 was 60 cc/m²·24 hrs.

Evaluation of Characteristics of Laminate Film Bags

The degree of shrinkage of the bags of Examples and Comparative Examples in hot water was measured, and the linear cut performance and the outward appearance of those bags were evaluated. The results are in Tables 1 and 2.

The degree of hot-water shrinkage was measured as follows: A reference line of 10 cm long was marked on each bag both in the MD direction and in the TD direction, and the thus-marked bags were subjected to retorting treatment in hot water at 120° C. for 20 minutes. Then, at 23° C. and 50% RH, the length of each bag was measured. The hot-water shrinkage, C, is represented by:

$$C=(A-B)/A \times 100(\%)$$

in which A indicates the original length, and B indicated the length of the shrunk bag.

The linear cut performance was measured as follows: 120 cc of water was put into each bag (width 130 mm×length 150 mm), which was then subjected to retorting treatment in hot water. Next, the sealed edge of each bag was notched at intervals of 2 cm in the MD direction, and the bag was torn by hand at its notch. The deviation at the position of 100 mm of the torn bag was measured. Five points were measured in each bag. Five samples of bags were tested in that manner in each Example and each Comparative Example, and the average deviation was obtained. The bag for which the average deviation was not larger than 10 mm was evaluated good (O); while that for which the average deviation was larger than 10 mm was evaluated bad (X).

The outward appearance was evaluated as follows: Three-corner-sealed casings for ham and sausage were formed from each laminate film, filled with hams or sausages, and retorted at 120° C. for 20 minutes. The airtight sealability of the packaged hams or sausages in the casings, and the smoothness of the casings were checked. The casings in which the packaged hams or sausages were airtightly sealed to have a flat surface were evaluated good (O); and those in which the packaged hams or sausages were deformed to have a warped surface were evaluated bad (X).

As the total evaluation, the samples of which the linear cut performance and the outward appearance were both good were evaluated good (O); and those of which any one of the two was bad were evaluated bad (X).

TABLE 1

| | Condition for Forming Easy-cleavage Shrink Film | | | Composition and Thickness (µm) of Each Layer of Laminate Film | | | Bags of Laminate Film | | | |
|---|---|---|---|---|---|---|---|---|---|---|
| | Raw Material Composition (wt. pts.) | | Heat-treatment Temp. | Shrinkage MD/TD (%) Single | 1st Layer | 2nd Layer Easy-cleavage | 3rd Layer | Shrinkage MD/TD (%) | Linear Cut Perform- | Outward Appear- | Total |
| | Ny 6 | MXD 6 | (° C.) | Film | CPP | SF | CPP | Laminate | ance | ance | Evaluation |
| Example 1 | 60 | 40 | 160 | 29/27 | 30 | 15 | — | 17/16 | O | O | O |
| Example 2 | 60 | 40 | 160 | 28/28 | 15 | 15 | 15 | 16/16 | O | O | O |
| Example 3 | 70 | 30 | 150 | 30/28 | 15 | 15 | 15 | 18/17 | O | O | O |
| Example 4 | 70 | 30 | 170 | 26/24 | 15 | 15 | 15 | 16115 | O | O | O |
| Example 5 | 70 | 30 | 190 | 20/20 | 15 | 15 | 15 | 14/14 | O | O | O |
| Example 6 | 80 | 20 | 160 | 29/29 | 15 | 15 | 15 | 17/17 | O | O | O |
| Example 7 | 70 | 30 | 150 | 30/28 | 30 | 15 | 15(*A) | 20/19 | O | O | O |
| Example 8 | 70 | 30 | 150 | 30/28 | four-layered structure(*B) (15/15/15/15) | | | 19/18 | O | O | O |

*A: Oriented Nylon
*B: CPP/easy-cleavage shrink film/oriented nylon/CPP

TABLE 2

| | Condition for Forming Easy-cleavage Shrink Film | | | Composition and Thickness (μm) of Each Layer of Laminate Film | | | Bags of Laminate Film | | | |
|---|---|---|---|---|---|---|---|---|---|---|
| | Raw Material Composition (wt. pts.) | | Heat-treatment Temp. | Shrinkage MD/TD (%) Single | 1st Layer | 2nd Layer Easy-cleavage | 3rd Layer | Shrinkage MD/TD (%) | Linear Cut Perform- | Outward Appear- | Total |
| | Ny 6 | MXD 6 | (° C.) | Film | CPP | SF | CPP | Laminate | ance | ance | Evaluation |
| Comp. Example 1 | 80 | 20 | 210 | 5/5 | 30 | 15 | — | 3/3 | ○ | X | X |
| Comp. Example 2 | 80 | 20 | 210 | 5/5 | 15 | 15 | 15 | 3/3 | ○ | x | X |
| Comp. Example 3 | 70 | 30 | 210 | 7/5 | 15 | 15 | 15 | 5/3 | ○ | X | X |
| Comp. Example 4 | 90 | 10 | 160 | 30/29 | 15 | 15 | 15 | 17/16 | X | ○ | X |
| Comp. Example 5 | 100 | 0 | 160 | 30/30 | 15 | 15 | 15 | 17/17 | X | ○ | X |
| Comp. Example 6 | 100 | 0 | 210 | 5/4 | 15 | 15 | 15 | 3/2 | X | X | X |

Table 1 verifies the following: The bags of any of the easy-cleavage shrink laminate films 22, 24 and 27 of Examples 1 to 8 comprise an easy-cleavage shrink film 19 and a sealant film 21, in which the easy-cleavage shrink film 19 comprises from 40 to 85 parts by weight of Ny 6 and from 15 to 60 parts by weight of MXD 6, and was drawn at an orientation ratio of not smaller than 2.8 times both in the MD direction and in the TD direction and thermally fixed at a heat-treating temperature falling between 120 and 195° C. to thereby have a degree of shrinkage of from 15 to 40% when it is put in hot water at 120° C. under pressure of about 2.0 kg/cm$^2$ for 20 minutes. Therefore, when they were torn by hand, the tearing deviation was small, and their linear cut performance was good.

In addition, since the degree of shrinkage of the bags of any of the laminate films 22, 24 and 27 is large, the wrapped or packaged goods in those bags were airtightly sealed therein, and the outward appearance of the bags was good.

Further, since the easy-cleavage film 18 of the bags of those Examples is comprised of Ny 6 and MXD 6 in a predetermined ratio, the gas barrier performance of those bags was good.

On the other hand, Table 2 indicates the following: The outward appearance of the bags of any of the laminate films of Comparative Examples 1 to 3 was bad. This is because, even though the Ny 6 content and the MXD 6 content of those bags were within the scope of the invention, the heat-treating temperature for the bags overstepped the scope of the invention and the degree of hot-water shrinkage of the bags was smaller than 15%.

The linear cut performance of the bags of any of the laminate films of Comparative Examples 4 and 5 was bad. This is because, even though the degree of hot-water shrinkage of these bags was within the scope of the invention, the Ny 6 content and the MXD 6 content of the bags were outside the scope of the invention.

The linear cut performance and the outward appearance of the bag of the laminate film of Comparative Example 6 were both bad. This is because the Ny 6 content and the MXD 6 content of the bag were outside the scope of the invention and the degree of hot-water shrinkage of the bag was smaller than 15%.

In addition, since the nylon film constituting the bags of Comparative Examples 5 and 6 did not contain MXD 6, the gas barrier performance of the bags was bad.

As has been described in detail hereinabove, the present invention provides an easy-cleavage shrink laminate film which is harmless to the environment, which is easy to tear and which is moderately shrinkable, and provides a bag made of the laminate film.

While the invention has been described in detail and with reference to specific embodiments thereof, it will be apparent to one skilled in the art that various changes and modifications can be made therein without departing from the spirit and scope thereof.

What is claimed is:

1. An easy-cleavage shrink laminate film comprising;
    an easy-cleavage shrink film which comprises from 40 to 85 parts by weight of nylon 6 (Ny 6) and from 15 to 60 parts by weight of meta-xylylene adipamide (MXD 6) (provided that Ny 6+MXD 6=100 parts by weight) and which has been drawn at an orientation ratio of not smaller than 2.8 times both in the MD direction (machine direction) and in the TD direction (transverse direction) and thermally fixed at a heat-treating temperature falling between 120 and 195° C. to thereby have a degree of shrinkage of from 15 to 40% when it is put in hot water at 120° C. under pressure for 20 minutes, and
    a sealant film as laminated on one surface of the easy-cleavage shrink film.

2. The easy-cleavage shrink laminate film as claimed in claim 1, wherein a sealant film is further laminated on the other surface of the easy-cleavage shrink film.

3. A bag made of the easy-cleavage shrink laminate film of claim 1 or 2.

* * * * *